(12) United States Patent
Bauer

(10) Patent No.: US 7,354,019 B2
(45) Date of Patent: Apr. 8, 2008

(54) SEAT, AND AIRCRAFT PASSENGER SEAT IN PARTICULAR

(75) Inventor: Jürgen Bauer, Sulzbach (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 179 days.

(21) Appl. No.: 11/131,331

(22) Filed: May 18, 2005

(65) Prior Publication Data

US 2005/0264047 A1 Dec. 1, 2005

(30) Foreign Application Priority Data

May 27, 2004 (DE) ...................... 10 2004 026 023

(51) Int. Cl.
 *B64D 11/06* (2006.01)
(52) U.S. Cl. ............................... 244/118.6; 244/122 R; 297/216.1
(58) Field of Classification Search ............. 244/118.6, 244/118.5, 122 R; 297/216.1, 216.13, 216.15, 297/216.16, 452.42, 354.13
See application file for complete search history.

(56) References Cited

U.S. PATENT DOCUMENTS

| | | | | |
|---|---|---|---|---|
| 2,055,843 A | * | 9/1936 | Helfinstine ............. | 237/12.3 A |
| 5,385,382 A | * | 1/1995 | Single et al. .......... | 297/180.13 |
| 5,795,018 A | * | 8/1998 | Schumacher et al. .. | 297/184.17 |
| 5,984,415 A | * | 11/1999 | Schumacher et al. .... | 297/411.2 |
| 6,189,966 B1 | * | 2/2001 | Faust et al. ............ | 297/180.14 |
| 6,505,890 B2 | * | 1/2003 | Riley et al. .............. | 297/452.2 |
| 6,612,646 B1 | * | 9/2003 | Gunther et al. .......... | 297/216.1 |
| 6,786,541 B2 | * | 9/2004 | Haupt et al. ............. | 297/180.1 |
| 6,976,734 B2 | * | 12/2005 | Stoewe .................. | 297/180.14 |

FOREIGN PATENT DOCUMENTS

| | | |
|---|---|---|
| DE | 24 50 092 A1 | 4/1776 |
| DE | 41 12 631 C1 | 4/1992 |
| DE | 196 34 370 C2 | 3/1998 |
| DE | 198 51 142 C2 | 5/2000 |
| DE | 199 49 935 C1 | 11/2000 |
| DE | 100 19 484 A1 | 10/2001 |
| DE | 101 06 355 C1 | 10/2002 |
| DE | 203 08 331 U1 | 9/2003 |
| DE | 203 10 120 U1 | 10/2003 |

* cited by examiner

*Primary Examiner*—Timothy D. Collins
(74) *Attorney, Agent, or Firm*—Roylance, Abrams, Berdo & Goodman, L.L.P.

(57) ABSTRACT

A seat, an aircraft passenger seat in particular, has seat components such as a seat element, a backrest retained by a backrest structure, and control and functional elements. At least one main component of the backrest structure is in the form of a hollow section 33. The cavity of the hollow section provides a guide for delivery of energy to at least one functional or control element requiring supply of energy.

8 Claims, 3 Drawing Sheets

SEAT, AND AIRCRAFT PASSENGER SEAT IN PARTICULAR

FIELD OF THE INVENTION

The present invention relates to a seat, an aircraft passenger seat in particular, having seat components such as a seat element, a backrest retained by a backrest structure, and control and functional elements.

BACKGROUND OF THE INVENTION

DE 100 19 484 describes a modem aircraft passenger seat having a seat element, a backrest retained by backrest structure, and control and functional elements. For lengthy travel periods, the several control and functional elements serve in part to optimize the seat comfort afforded the seat occupant and in part to perform functions relating to flight operation. The elements increasing comfort are represented, for example, by adjustment mechanisms for movable seat components, such as mechanisms for adjustment of the tilt of the backrest and/or a leg rest. Mechanisms which may be operated by the seat occupant to control lighting, audio, or video devices, air conditioning devices and the like are also customarily present.

Installation of a correspondingly large number of such seat components results in a relatively complex configuration of such seats. However, a compact, light-weight configuration is of decisive importance for such seats provided for passenger transportation, especially for aircraft passenger seats for commercial aviation.

SUMMARY OF THE INVENTION

An object of the present invention is to provide a seat, an aircraft passenger seat in particular, having a configuration which facilitates the installation of the pertinent control and functional elements.

This object is attained according to the present invention by a seat, an aircraft passenger seat in particular, having a structural element designed as an indispensable component of the seat structure, and used in the added function of delivery of energy to supply functional or control elements of the seat. Simplification of the configuration of the components to be integrated into the seat is achieved. In addition, use of the cavity of the hollow section of the backrest structure as a guide for transmission of energy to connected elements does not result in structural weakening of the hollow section of the backrest structure. Structural simplification is not achieved to the detriment of the structural strength required for seats of this type for absorption of the forces occurring in the event of a crash.

The cavity of the hollow section may be provided as a guide for lines for transmission of electric and/or mechanical energy to electric or mechanical functional or control elements.

In one especially advantageous exemplary embodiment, the cavity of the hollow section is provided as a guide for delivery of a flowable medium. In particular, a line for delivery of air extends through the cavity of the hollow section to an air outlet nozzle, preferably for delivery of fresh air.

In one especially advantageous embodiment, the hollow section forming the backrest structure is in the form of a one-piece frame component bent to a U-shape. The sides of the U-shaped frame extend along the side edges of the associated backrest. The transverse strip of that frame connects the sides associated with the upper edge area of the backrest.

An opening extending into the interior of the hollow section for connection of a source of air may be provided on one of the sides of the frame component in the area of its lower end adjacent to the seat element. The source of air may be an air pump positioned on the seat element below the seat surface. Preferably, a radial blower may be operated by an electric motor. The outlet side of the blower is connected by a hose line to the opening in the side of the frame component.

In one advantageous embodiment of the seat, a branch permitting discharge of air from the cavity of the hollow section and leading to an air outlet nozzle may be provided on the transverse strip connecting the sides of the frame component and extending along the upper edge area of the backrest.

For seats provided in a succession of rows of seats, as is the case especially with aircraft passenger seats, the air outlet nozzle may be mounted on the rear side of the backrest of the seat so that the air outlet is oriented rearward. Accordingly, the outlet nozzle functions as a fresh air nozzle for the seat immediately to the rear. Preferably, a control element may be operated by a seat occupant to control the discharge of air, and may be provided on the rear side of the backrest spatially coordinated with the outlet nozzle.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

The disclosed embodiment of the present invention comprises an aircraft passenger seat. The present invention need not, however, be limited to use with aircraft passenger seats. In principle, it may also be applied to any seat, including ones used in overland and nautical vehicles.

Figure 1:
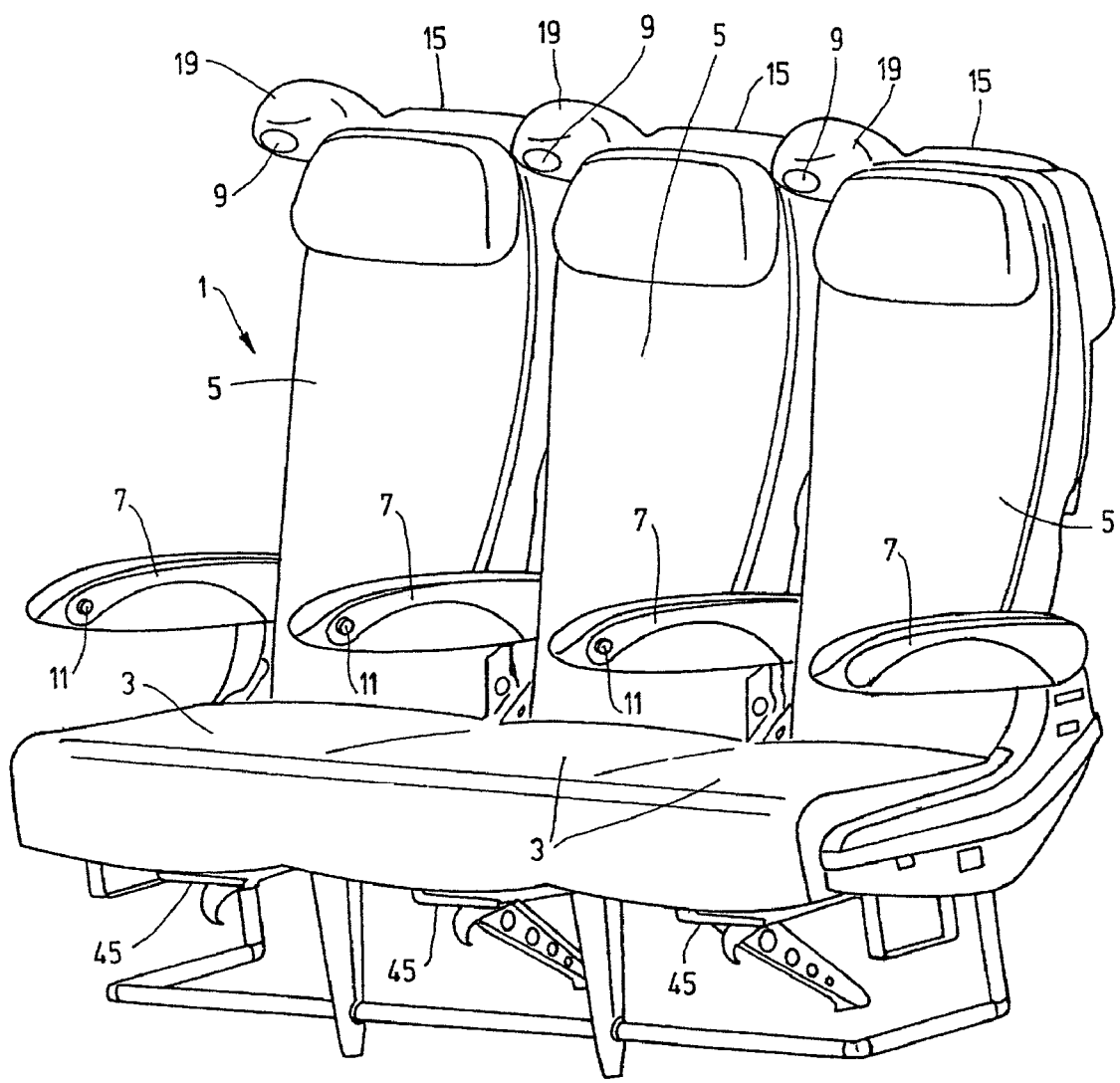
FIG. 1 is a perspective view of a row of three seats for mounting on an aircraft in accordance with an embodiment of the present invention.

FIG. 1 is a greatly simplified diagram of a row of seats 1 forming part of the seating of an aircraft for commercial aviation and containing three seats positioned side by side, with the row 1 of seats shown diagonally from the front. The seat elements are identified by the reference numeral 3. The inclination of the backrests 5 relative to the seat element 3 may be adjusted by a tilting mechanism (not shown) and may be controlled by actuation of push buttons 11 positioned on arm rests 7. Each arm rest 7 extends longitudinally and forms a lateral limit of the respective seat area and which optionally may be pivoted or folded down. A side bracket 19 has a reading light 9 mounted thereon and pointing obliquely downward, and is positioned on the upper edge 15 of each backrest 5. A storage compartment 45 for a life vest, in the manner customary for aircraft passenger seats, is situated beneath the seat element 3.

Figure 2:
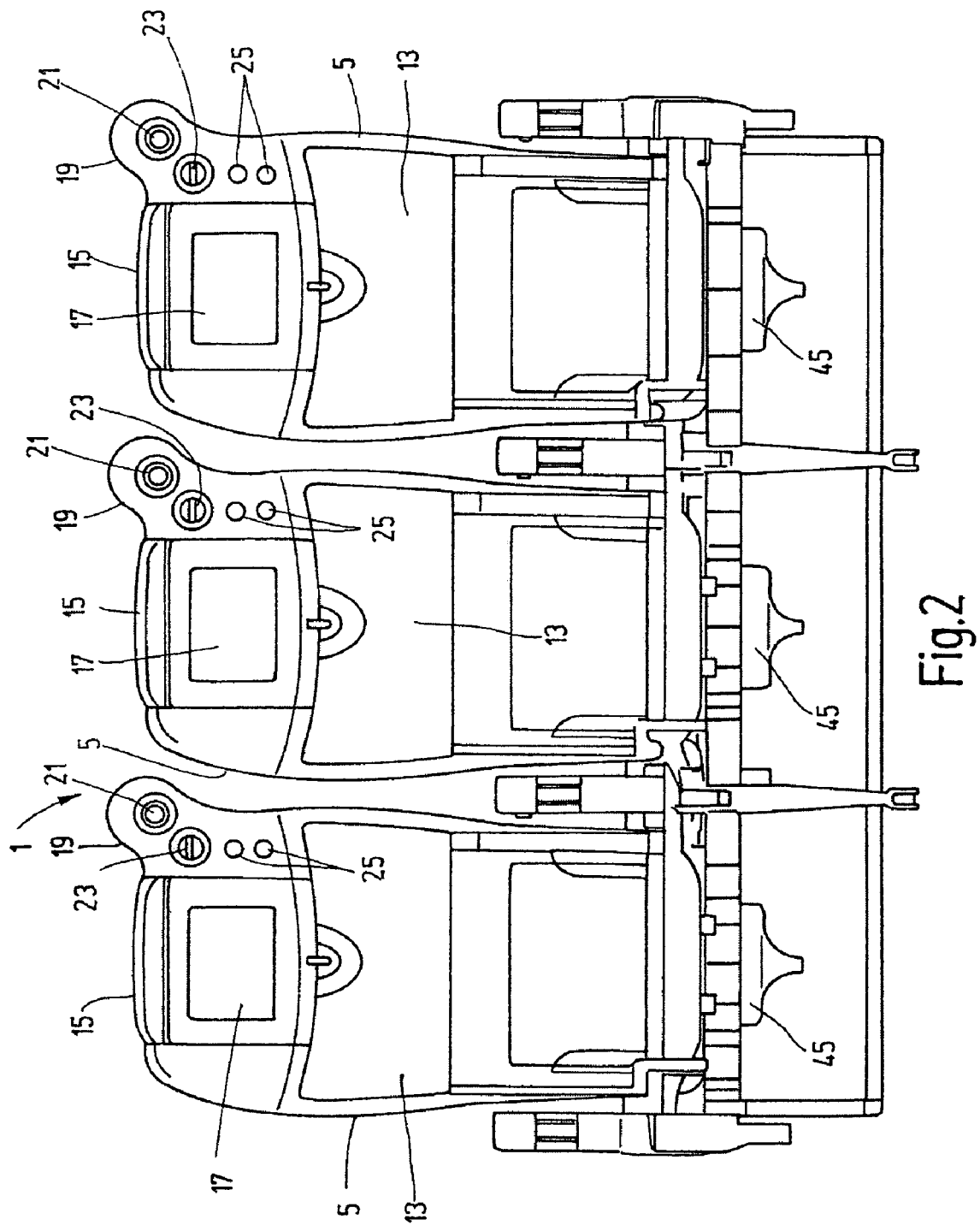
FIG. 2 is a rear elevated view of the row of seats shown in FIG. 1.

FIG. 2 presents a view in diagram form of the rear side of the row of seats 1 of FIG. 1. As is customary for aircraft passenger seats, a folding tabletop 13 is mounted on the rear side of the backrest 5. A flat screen monitor 17 is mounted between the upper edge 15 of the backrest 5 and the tabletop 13. The bracket 19, having the reading light 9 on its front side, has on its rear side shown in FIG. 2 a fresh air outlet nozzle 21. Mounted diagonally below the outlet nozzle 21 is a rotary switch 23 for controlling the air discharged from the outlet nozzle 21. Display elements 25 are below the rotary switch 23 and provide displays relating to flight operation.

Figure 3:
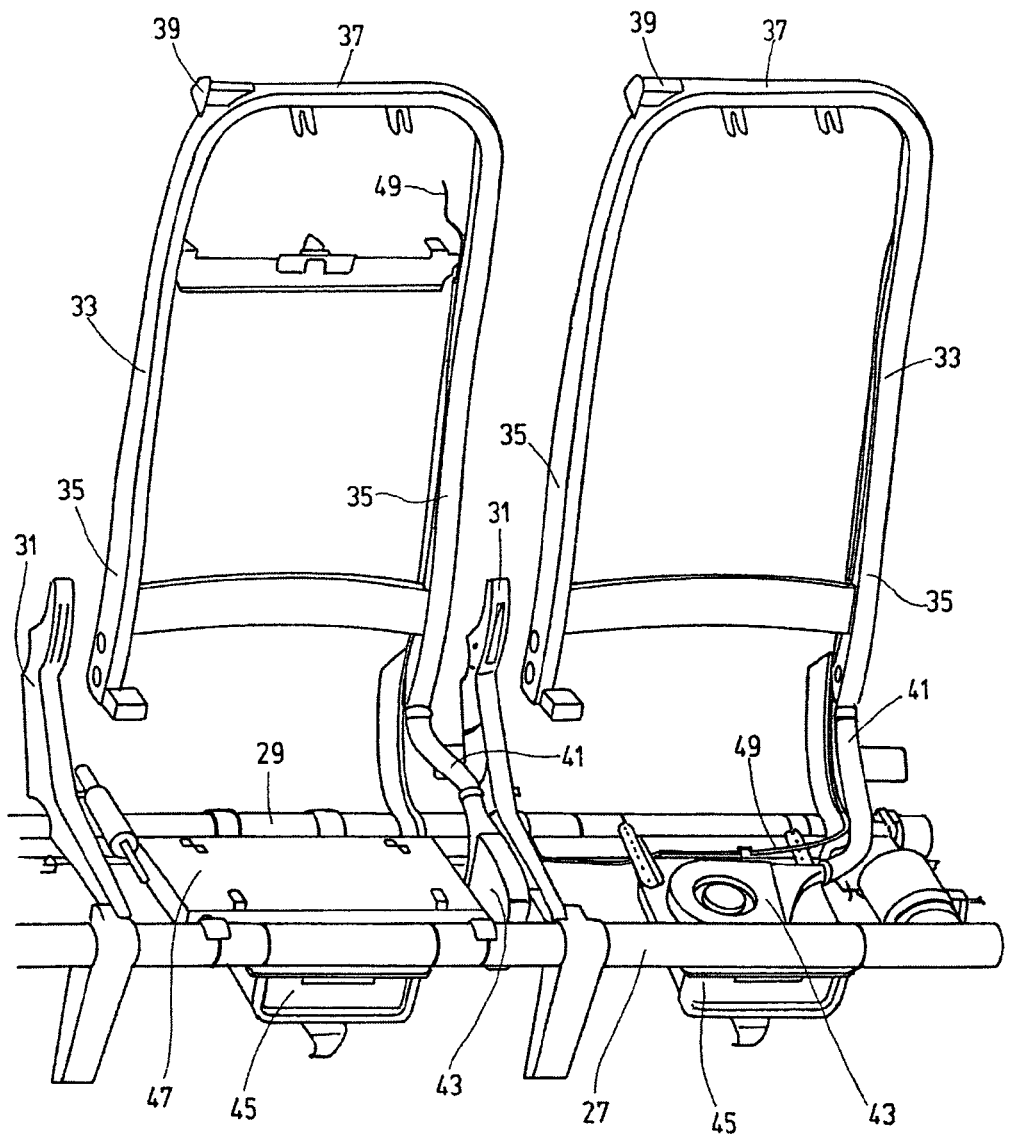
FIG. 3 a perspective view in the form of a highly simplified diagram only of some structural elements and interior structural components of the row of seats shown in FIG. 1.

FIG. 3 illustrates delivery of energy for supplying the outlet nozzle 21 with fresh air. For the sake of greater clarity, only the structural elements required for explanation of the present invention are shown in FIG. 3. A tubular main traverse support 27 is mounted above the cabin floor. A rear transverse support 29 forms the support for the seat element (not shown). Longitudinal supports 31, of which only the pair associated with the seat positioned on the left is shown in FIG. 3, has the adjustable-angle backrest mounted thereon (mounting mechanism not shown).

The backrest structure has a one-piece, U-shaped frame component 33 having a closed hollow section. The frame sides 35 extend longitudinally, and a frame cross-web 37 connects the frame sides at the upper edge 15 of the backrest. The cavity of the hollow section of the frame component 33 forms a pipeline or conduit for supplying the outlet nozzle 21 with air. For this purpose, one side of the upper cross-web 37 has a branch 39 by through which air discharges from the cavity of the hollow section and may be delivered, with a control valve (not shown) operated by the switch 23 inserted between them, via branch 39 to the outlet nozzle 21. Air enters at the lower end of the side 35 of the frame component 33 positioned on the right in FIG. 3, by way of a connection opening. The connection opening is connected a hose line 41 extending to the discharge side of an air pump in the form of a radial blower 43 operated by an electric motor.

For the seat shown positioned on the right in FIG. 3, the blower 43 is positioned below the seat surface in the central area above the storage compartment 45 for a life vest conventionally mounted on the underside of the seat. Such configuration of the blower 43 is not mandatory. Depending on the design circumstances, the blower 43 may also be installed to the side of the central area so that the central area is optionally available for an electric and/or electronic device 47 connected by cabling 49 to corresponding electric/electronic devices such as a display screen, audio system, lighting system, and the like.

In the case of the described exemplary embodiment, the cavity of the hollow section forming the frame component 33 is used as an air duct. Electric energy is transmitted by separate cabling 49. The interior of the hollow section may, of course, also be used as a duct for cabling in place of or in addition to use as an air duct. Conduction of mechanical energy may also be provided in the hollow sections, for example, by operating cables or Bowden cables.

Supply of the outlet nozzles 21 with fresh air drawn in by the associated blower 43 from the area below the seat element 3 and delivered to the nozzle 21 could also be replaced by supply of the outlet nozzle 21 via the hollow section of the frame component 33 from a central air conditioning assembly of the respective vehicle/aircraft. For example, air may be conducted by the pipe of the main transverse support 27, and air could be delivered from it over a flexible branch line to the hollow section of the frame component 33.

The hollow section forming the frame component 33 is produced by a conventional extrusion process. In the event of use as a line for air, the cavity of the profile is, of course, sealed, with the exception of the air intake point and the air outlet point (branch 39).

While one embodiment has been chosen to illustrate the invention, it will be understood by those skilled in the art that various changes and modifications can be made therein without departing from the scope of the invention as defined in the appended claims.

What is claimed is:

1. A seat, comprising:
a seat element;
a backrest coupled to said seat element;
a U-shaped, substantially rigid, interior, hollow, one-piece backrest support frame fixedly coupled to and retaining said backrest, said support frame having side members extending along side edges of said backrest and having a cross member connecting said side members and extending crosswise along an upper edge area of said backrest, said side and cross members defining a cavity in hollow interiors thereof forming an air duct to convey air;
an air outlet nozzle connected to said support frame and in fluid communication with said air duct; and
an inlet opening in said support frame adjacent an end of one of said side members remote from said cross member for connection to an air source.

2. A seat according to claim 1 wherein
said cross member has a branch line connecting said air outlet nozzle to said air duct in fluid communication.

3. A seat according to claim 2 wherein
said air outlet nozzle is located on a rear side of said backrest to discharge air in a rearward direction opposite to a direction said seat element extends from said backrest.

4. A seat according to claim 3 wherein
a control element located on said rear side of said backrest regulates air flow through said air outlet nozzle.

5. A seat according to claim 1 wherein
an air source is positioned on said seat element below a seat surface thereof, and is connected by a flexible line to said air duct in fluid communication.

6. A seat according to claim 5 wherein
said air source is a radial blower actuated by an electric motor and having a side outlet connected by said flexible line to said air duct in fluid communication.

7. A seat according to claim 1 wherein
said seat element and said backrest form an aircraft passenger seat.

8. A seat according to claim 1 wherein
said backrest and said support frame are simultaneously pivotable relative to said seat element.

* * * * *